United States Patent [19]

Toyama et al.

[11] Patent Number: 4,794,512
[45] Date of Patent: Dec. 27, 1988

[54] DIGITAL CONTROLLING DEVICE

[75] Inventors: Eiji Toyama, Hitachi; Akira Sugano, Katsuta; Masahide Nomura, Hitachi, all of Japan

[73] Assignee: Hitachi, Ltd., Tokyo, Japan

[21] Appl. No.: 367,083

[22] Filed: Apr. 9, 1982

[30] Foreign Application Priority Data

Apr. 16, 1981 [JP] Japan ................................ 56-56248

[51] Int. Cl.[4] ............................................ G06F 15/00
[52] U.S. Cl. .................................. 364/140; 364/191; 364/194; 364/147
[58] Field of Search ......... 364/140, 194, 147, 188–193

[56] References Cited

U.S. PATENT DOCUMENTS 3,838,397 9/1974 Watson et al. ................... 364/194 X
3,875,564 4/1975 Thuruoka et al. .............. 364/140 X
4,064,394 12/1977 Allen ................................ 364/140 X

OTHER PUBLICATIONS

*Operating Systems;* by Madnick and Donovan; pp. 165-181, McGraw-Hill; N.Y., N.Y.; 1974.

Primary Examiner—Jerry Smith
Assistant Examiner—Allen MacDonald
Attorney, Agent, or Firm—Antonelli, Terry & Wands

[57] ABSTRACT

A digital controlling device in which arithmetic operations are executed under control of a predetermined program on the basis of an input signal obtained from at least one detector in a section to be controlled to generate a driving signal, said driving signal being sent to actuating means in said controlling section. Said digital controlling device comprises a plurality of calculation specification tables for respectively describing therein an operation type for each arithmetic element, storage addresses of input/output data for said each arithmetic element, and storage addresses of operation parameters for the each arithmetic element; a calculation sequence table for describing therein the number of arithmetic blocks and addresses used for reading-out of associated said calculation specification tables corresponding to said arithmetic elements in an order that arithmetic operations are to be executed in said digital controlling device, said calculation sequence also being a total arithmetic element number at its leading address; data tables for respectively describing therein data in the corresponding address zones specified in said calculation specification tables; and a processing program section for executing said operation elements in said order described in said calculation sequence table and reading data necessary for said execution from said data tables on the basis of associated said calculation specification tables.

5 Claims, 7 Drawing Sheets

DIGITAL CONTROLLING DEVICE

The present invention relates to a digital controlling device.

As a higher level and more complicated control function is required for a control device, an increasing number of analog controlling devices have been replaced by digital controlling devices, because the digital controlling device advantageously allows an easy realization of the high level control function and increased calculation precision as well as an easy failure diagnosis and modification, when compared with analog controlling devices.

In the digital controlling device, the control function is described in the form of a software representation. In this case, it has been, so far, common practice to describe the processing contents in assembler language because of its easy processing by the digital computer, or in FORTRAN language because a user can more easily understand the processing contents than the assembler language.

Such a conventional software description system has an advantage that the computer is capable of processing data at a high speed, because the computer will decode and interpret the language directly without any additional conversion for execution of arithmetic operations.

The conventional description system, on the other hand, has disadvantages that creation and modification of the software are troublesome which might lead to operation errors, and that said creation and modification can not be effected easily because the operation block diagram indicative of the operation contents can not be associated directly with the software description.

Accordingly, it is an object of the present invention to provide a digital controlling device which eliminates the above defects and in which the operation block diagram can be associated directly with the software description, while allowing an easy creation and modification of the software.

The present invention is based on the fact that many operation elements or blocks in the operation block diagram can be standardized depending on the operation type. That is, description of the operation contents can be obtained only by creating three types of tables; i.e. (1) calculation specification tables for respectively describing therein the operation contents and necessary data for each operation element, (2) a calculation sequence table for describing therein addresses used for reading-out of the calculation specification tables listed in the calculation sequence, and (3) data tables for respectively describing therein only the data specified by one of the calculation specification tables.

The above and other objects, features and advantages will be apparent from the following detailed description taken in connection with the accompanying drawings, in which.

Explanation will be made in the case where the present invention is applied to a system for controlling the temperature of oil supplied to bearings of turbines used in a thermal power plant, but it will be easily appreciated from the following disclosure that the invention may be also applied to other control systems.

The temperature of oil supplied to the turbine bearings in a thermal power plant will cause a change of the oil viscosity, which provides a great effect on the smooth rotation of the turbine. The control of the oil temperature, therefore, is necessary to secure the optimum oil temperature of the turbine bearings in accordance with the rotational speed of the turbine.

Figure 1:
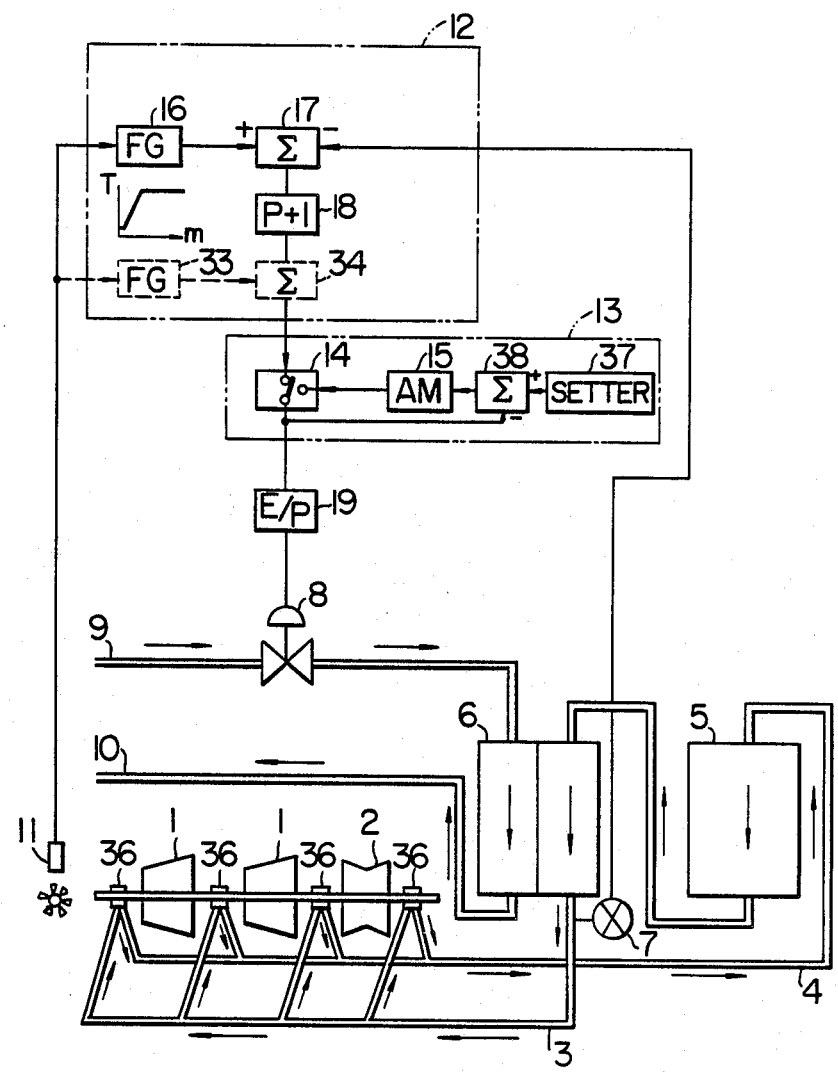
FIG. 1 is a block diagram of a system for controlling the temperature of oil supplied to bearings of turbines used in a thermal power plant, which system includes a digital controlling device in accordance with the present invention.

Referring now to FIG. 1, there is shown a block diagram of a system for control of the temperature of oil supplied to turbine bearings, in which bearing oil will be supplied from an oil cooler 6 via a supply pipe 3 to bearings 36 used for the turbines 1 and a generator 2. The oil will then be fed to an oil reservoir or tank 5 through an oil discharge pipe 4, and further returned to the cooler 6 where the oil is adjusted to a desired temperature by use of cooling water supplied thereinto through pipes 9 and 10 in order to again supply it to the bearings.

In order to control the bearing oil temperature to a target temperature in response to the rotational speed of the turbine, a digital controlling device 12 is provided in the oil-temperature controlling system for performing predetermined controlling arithmetic operations to operate an actuator or valve 8 for adjustment of the cooling water.

More specifically, the digital controlling device 12 includes a function generator 16 for converting an output n of a turbine speed detector 11 to a target temperature T in such a relation as shown by a graph in FIG. 1, and an adder 17 for comparing said target temperature T with an output from a bearing oil temperature detector 7 to thereby calculate a difference between an actual oil temperature and the target temperature.

A proportional/integral circuit 18 which performs proportional/integral operations, on the other hand, receives the temperature differential from the adder 17 and generates a driving signal. This signal is sent to the control valve 8 via an automatic/manual switch 14 in a manual operating circuit 13 and an electric to pneumatic converter (EP converter) 19.

The manual operating circuit 13 is used to switch the automatic/manual switch 14 to its analog memory position to manually actuate the system, when the system is in its starting condition or the digital controlling device 12 is defective. That is, while the control is achieved in accordance with the output of the digital controlling device 12, a setter 37 is set to zero, as a result, an analog memory 15 outputs the same value as the output of the digital controlling device 12. Therefore, when the switch 14 is changed-over on the side of the analog memory 15, the valve 8 to be controlled is not chocked and then if the output of the setter is changed, the valve 8 is actuated in accordance with the output of the setter 37.

A function generator 33 and an adder 34 denoted by dotted lines in FIG. 1 (which will be detailed later) are added to the associated function generator and adder denoted by solid lines in FIG. 1, when it is required to afford the feed-forward control function to the oil-temperature control system.

Figure 2:
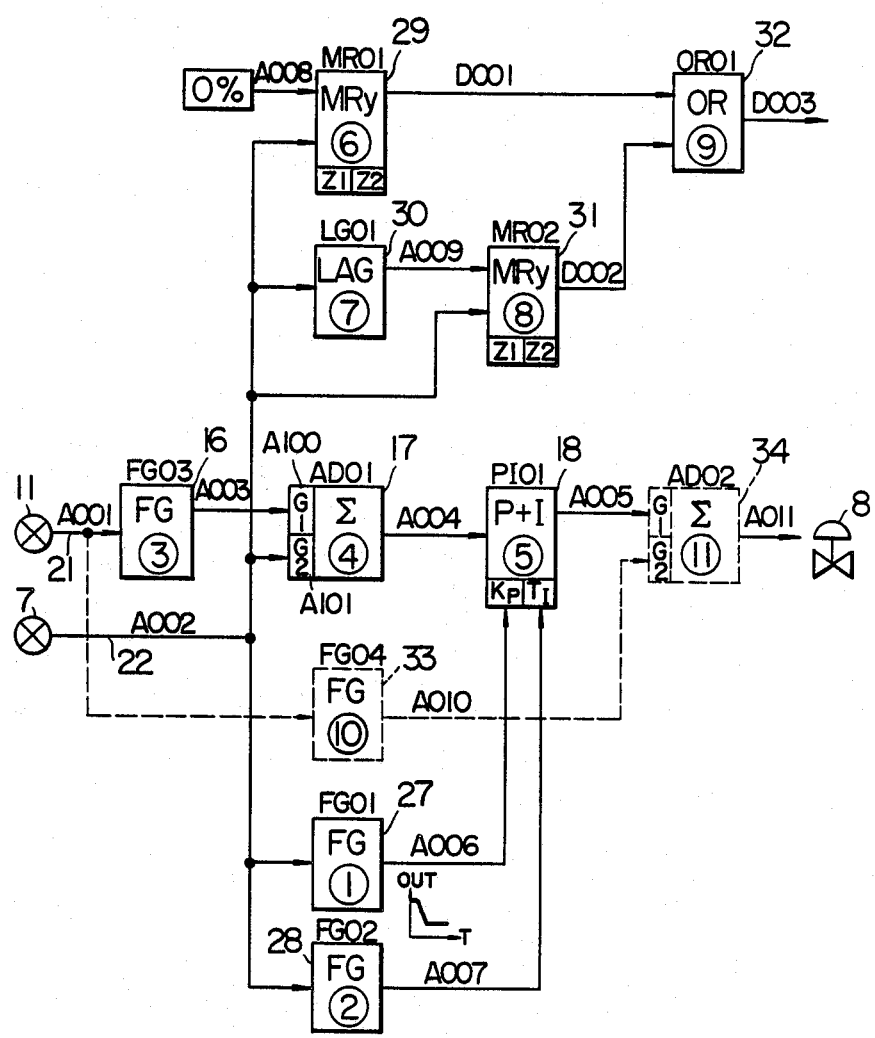
FIG. 2 is a detailed block diagram of the digital controlling device in FIG. 1.

There is shown a detailed block diagram of the control function of the digital controlling device in FIG. 2 wherein its arithmetic elements are illustrated in a hardware block form. Such a configuration as shown in FIG. 2, however, is well known to those skilled in the field of automatic control, and thus the explanation thereof will be made briefly.

In the control device, an optimum target temperature for a turbine speed signal 21 corresponding to n in FIG. 1 will be calculated by the function generator 16. The adder 17 will calculate the difference between the target temperature and the actual temperature and the proportional/integral circuit 18 will perform proportional/integral operations on the difference.

Since the control valve 8 will change discontinuously with respect to change of the bearing oil temperature, the proportional gain $K_p$ and integral time $T_I$ must be varied according to a bearing oil temperature signal 22. To this end, there are provided function generators 27 and 28 which each have such an output versus temperature (T) characteristics as illustrated by a graph at the bottom portion of FIG. 2.

An offset monitoring relay 29 receives the bearing oil temperature signal 22 and generates a high level output when the difference between the input signal 22 and the target value 0% (the target temperature is represented in terms of percentage) exceeds an upper limit Z1 or lower limit Z2. The signal 22 is also supplied to a first order lagger 30 and an offset monitoring relay 31. The offset monitoring relay 31 monitors the difference between an output of the first order lagger 30 and the signal 22 in order to detect a failure in the form of an abrupt change in the oil temperature (failure diagnostic function). The result of said failure diagnostic operation is sent to an OR element 32. The output of the OR element 32 is sent to the exterior, for example, to the automatic/manual switch 14 for automatic switching control. Signals in the control block diagram of FIG. 2 are designated with reference numerals starting from A001 for analog signals and with reference numerals starting from D001.

An embodiment of the digital controlling device in accordance with the present invention will be explained with reference to FIG. 3 which shows the entire software arrangement. As seen from the figure, the software of the invention is divided into a processing program section A and a table section B.

The computer executes an initialize program 301 to start with a start step 301 where various types of modes are specified, for example, to determine the period of a hardware timer. After this, various types of programs are started sequentially each time the computer judges that a timer interrupt program has been generated at a step 302.

A period start management program 303 functions to manage the start of said various programs, that is, to carry out sequential processings from a digital input process 304 to a watch dog timer 310. A period start management table 312 contains respective leading addresses and processing time of the execution programs used during the steps 303 to 310 in its executing order or sequence, and according to the executing order the period start management 303 is executed.

The processing procedure of FIG. 3 will be explained briefly in connection with FIG. 2. First, the digital input process 304 is started but there exists no digital input in the embodiment of FIG. 2. At an analog input process step 305, next, the analog input process 305 is started to enter the turbine speed signal 21 and the bearing oil temperature signal 22. Subsequently, a control arithmetic process 306 is started to execute various arithmetic blocks shown in FIG. 2 for failure diagnosis. The result of the failure diagnosis is output at a digital output process step 307 and the output of the proportional/integral circuit 18 is output at an analog output process step 308. An operator's console process 309 is used to enter the necessary information through operator's keyboard operations.

The processing periods of these processes are arbitrarily specified by the period start management 303. There are about 30 sorts of arithmetic operations including addition, subtraction, multiplication, division, proportion, proportional/integration and function generation. The arithmetic operations are each standardized, described in assembler language as its processing program section A and fixed in a ROM (read-only memory).

The table section B is provided to specify the processing contents of the processing program section A. In other words, programming can be obtained only by entering numerical values in desired portions of tables according to the operation contents.

More specifically, the software of the invention is divided mainly into the processing program section A and the table section B, as mentioned in the foregoing. The processing programs in the section A are initially described in assembler language with its good processing efficiency for standardization, and stored in the ROM. The table section, on the other hand, is arranged to allow an easy creation and modification of the data thereof by entry of numeral values alone.

Figure 4:
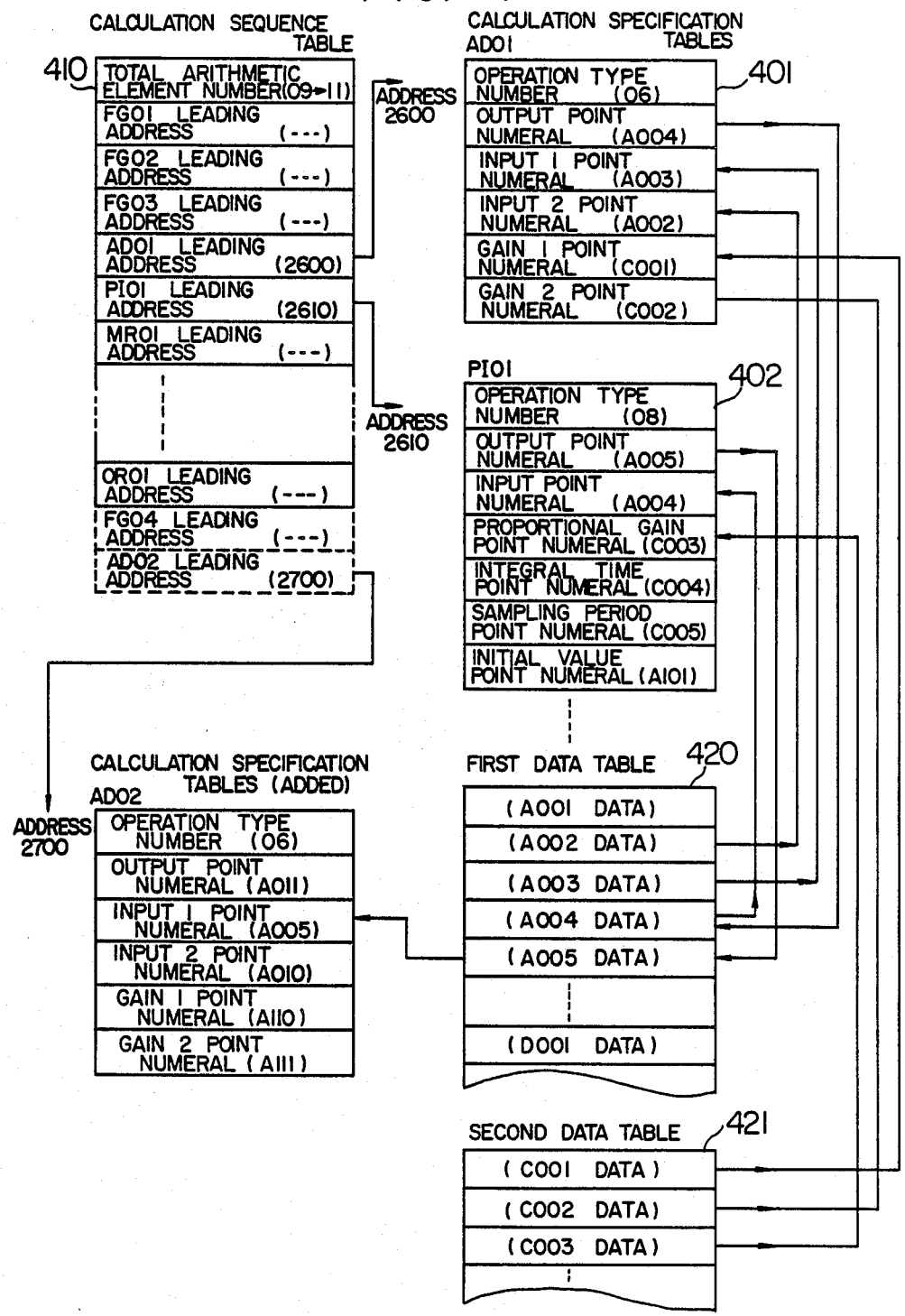
FIG. 4 shows contents, as an example, of different types of tables in which operation contents are described.

By way of example, more detailed explanation will be directed to the control operation process 306. Upon creation of the software, a calculation specification table 401 for the adder AD01 (17 in FIG. 2) is created in the following manner. An example of creating the calculation specification table 401 is shown in FIG. 4. More particularly, there are stored in the table 401, from the operation block diagram of FIG. 2, an operation type numeral 06 representative of the adder, followed by a numeral A004 indicative of an output point of the adder, point numerals A003 and A002 indicative of inputs 1 and 2 thereof, further followed by point numerals C001 and C002 indicative of gain 1 (corresponding to G1 in FIG. 2) and gain 2 (corresponding to G2 in FIG. 2) at the processing program section A. These determined informations are described in a predetermined order to thus form the calculation specification table 401 corresponding to the adder 17, as given in FIG. 4. In a similar way, there is created a calculation specification table 402, including an operation type numeral 08 indicative of the proportional/integral circuit, an output point numeral A005 and an input point numeral A004, a proportional gain point numeral A006, an integral time point numeral A007, a sampling cycle point numeral C003 and an initial value point numeral A101 are described at the processing program section A. With respect to other arithmetic operation elements, there can be similarly created calculation specification tables which comprise point numerals indicative of input/output data and calculation parameters. As a consequence, the calculation specification tables will correspond in number to all the operation blocks, for example, in FIG. 2.

Next, only the leading addresses of these calculation specification tables are described in a calculation sequence table 414. In FIG. 4, for example, the calculation specification table for the adder 17 (AD01) has a leading address of "2600" and the calculation specification table for the proportional/integral circuit 18 (PI01) has a leading address of "2610". The leading address of the calculation tables are each its operation type numeral. In a calculation specification table, the input/output point numerals and calculation parameters each form a sequence of consecutive addresses. The corresponding calculation sequential number is conveniently given in each circle in the blocks, during creating of the control block diagram as shown in FIG. 2.

Further, the total number of arithmetic blocks is placed at the heading of the calculation sequence table. In the case of FIG. 2, arithmetic blocks are 9 in total number.

On the other hand, data tables are divided into a first data table 420 and a second data table 421. The former table 420 contains therein data corresponding to point numerals A001, A002, ... D001, D002, ... which vary in value. The latter table 421 contains therein calculation parameter data C001, C002, ... semi-fixedly which are beforehand determined. The former table is stored in the RAM (random access memory), while the latter table is stored or written in the EP-ROM (erasable programmable ROM) semi-fixedly.

Figure 3:
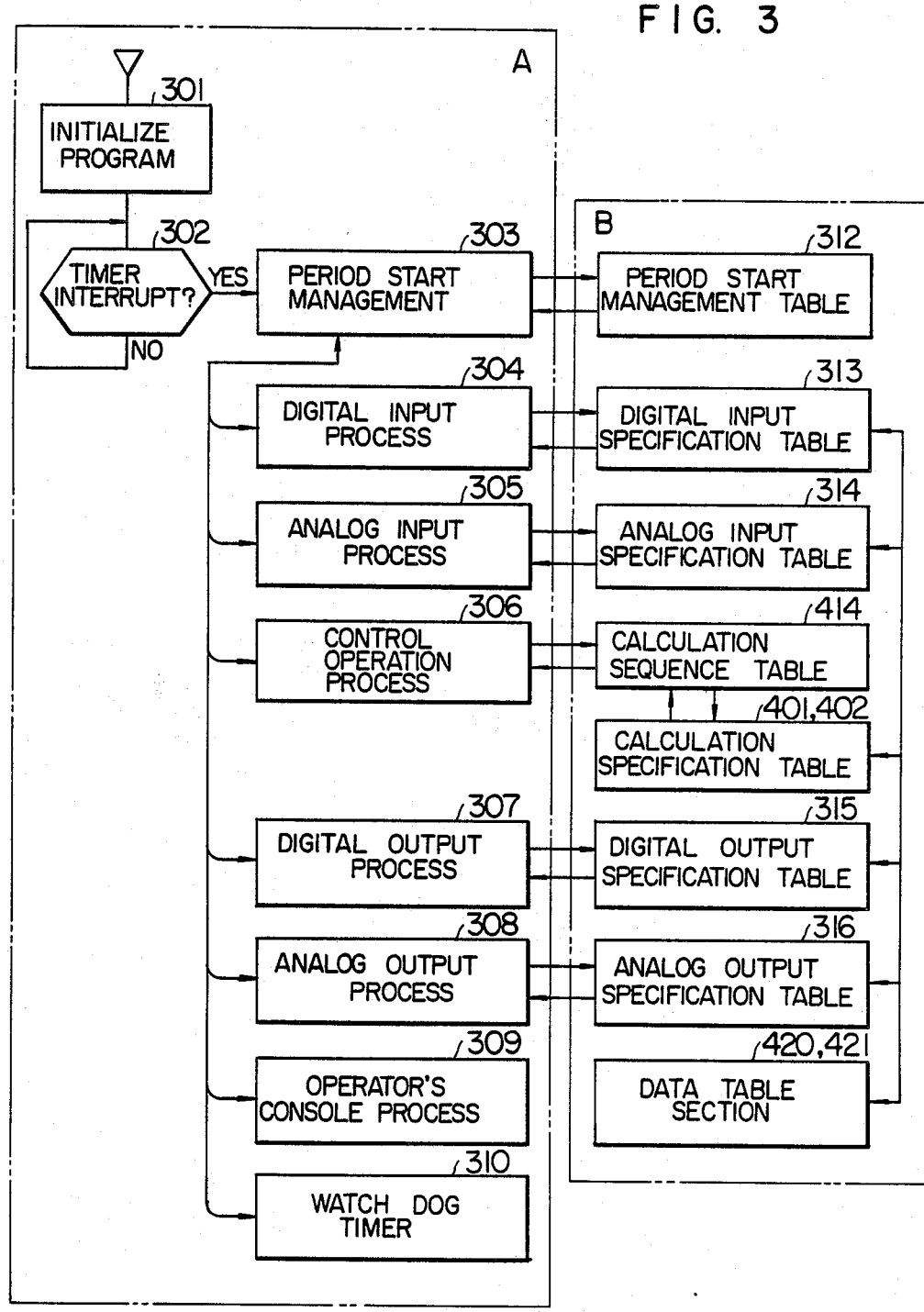
FIG. 3 is a structure of software used for control of the digital controlling device in accordance with an embodiment of the present invention.

Input/output point numerals of the digital controlling device are described in a corresponding digital input specification table 313, an analog input specification table 314, a digital output specification table 315 and an analog specification table 316 in FIG. 3, whereas data corresponding the point numerals are stored in a data table 420.

Figure 5:
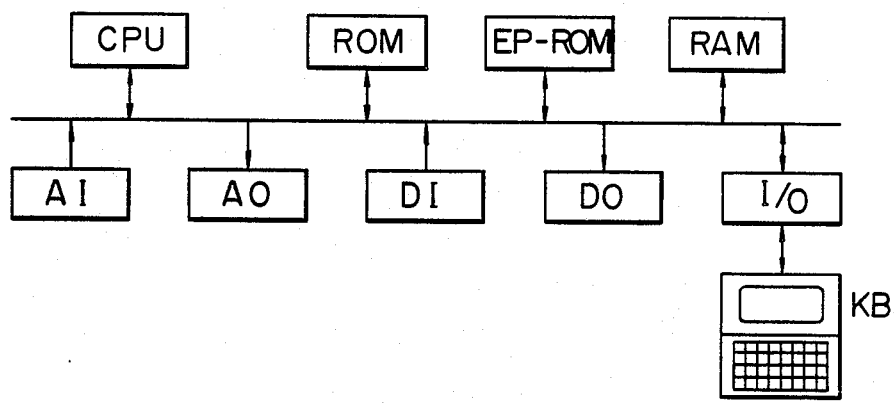
FIG. 5 is a structure of hardware, as an example, available for the present invention.

Turning now to FIG. 5, there is shown a general hardware configuration which is applicable to the present invention, which includes a CPU (central processing unit), a ROM (read-only memory) which stores the processing programs, an EP-ROM (erasable programmable ROM) which stores the calculation sequence table, the calculation specification table and the second data table, a RAM (ramdom access memory) which stores the first data table, an AI (analog input), an AO (analog output), a DI (digital input), a DO (digital output), an I/O (input/output interface) and a KB (keyboard).

On creation of various tables as shown in FIG. 4, the operator enters, using the keyboard KB, the address necessary for the EP-ROM and then one of the point numerals relating to an input/output, operation parameter, operation type and the like. By repeating such two-stage operation in sequence, a necessary table can be created.

The control operation processing program 306 will execute various tables created in the above-mentioned manner shown in FIG. 6, as follows.

First, at a step 601, the number of operation elements or blocks described at the leading address of the calculation sequence table is read to store it into the related register in the CPU. At a step 602, it is decided whether or not all the operation blocks have been executed. Since all the operation blocks have not been completed at first, the program will proceed to a next step 603 to enter the first leading address (for the first calculation specification table) next to the total operation block number described in the calculation sequence table in order to make a reference to the calculation specification table having the first leading address. When it is decided at a step 604 that the contents of the leading address of the calculation specification table are "00", the program will skip to a step 608. If it is decided that the contents are not "00", then the program will proceed to a next step 605 to decide the operation type on the basis of the leading address read at the step 603.

In the embodiment of FIGS. 2 and 4, since the arithmetic element FG01 is first executed, reference is first made to the calculation specification table corresponding to the function generator 27. On the basis of the contents of the leading address of the referred calculation specification table, the system will interpret the executing operation type. Similarly, the system will interpret the respective executing operation types with respect to the subsequent arithmetic operations. In the case of FIG. 4, for example, if the contents of the leading address are "06", then the system will interpret the executing operation type as an addition operation. Also, if the contents of the leading address are "08", then the system will interpret the operation type as proportional/integral operations. Control will jump to the corresponding address in the ROM which stores therein the program corresponding to the arithmetic element interpreted at the step 605. If the contents of the leading address are "06", then the control will jump to an addition program 606. When the contents of the leading address are "08", the control will jump to a proportional/integral operation program 607. And the operation of the jumped step will be executed according to the corresponding program stored in the ROM. Of the program-executed contents, addition and proportional/integral operations will be detailed later.

After completion of the above processing, the control will go to the next leading address in the operation sequence table at a step 608 and will decrement by 1 the number of operation blocks in the operation sequence table at a step 609. The above procedure will be repeated until the number of operation blocks reaches zero, completing the execution of all the operation blocks.

Figure 7:
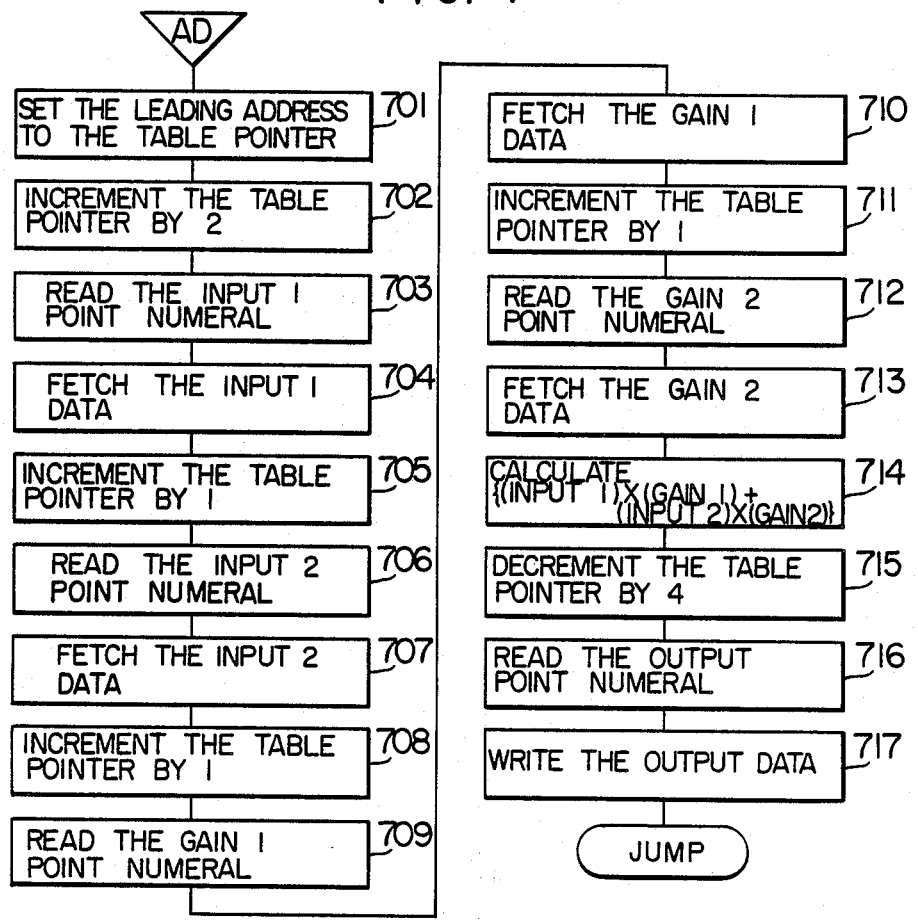
FIG. 7 is a flow chart of exemplary operation of an addition execution program at a step 606 in FIG. 6.
Figure 6:
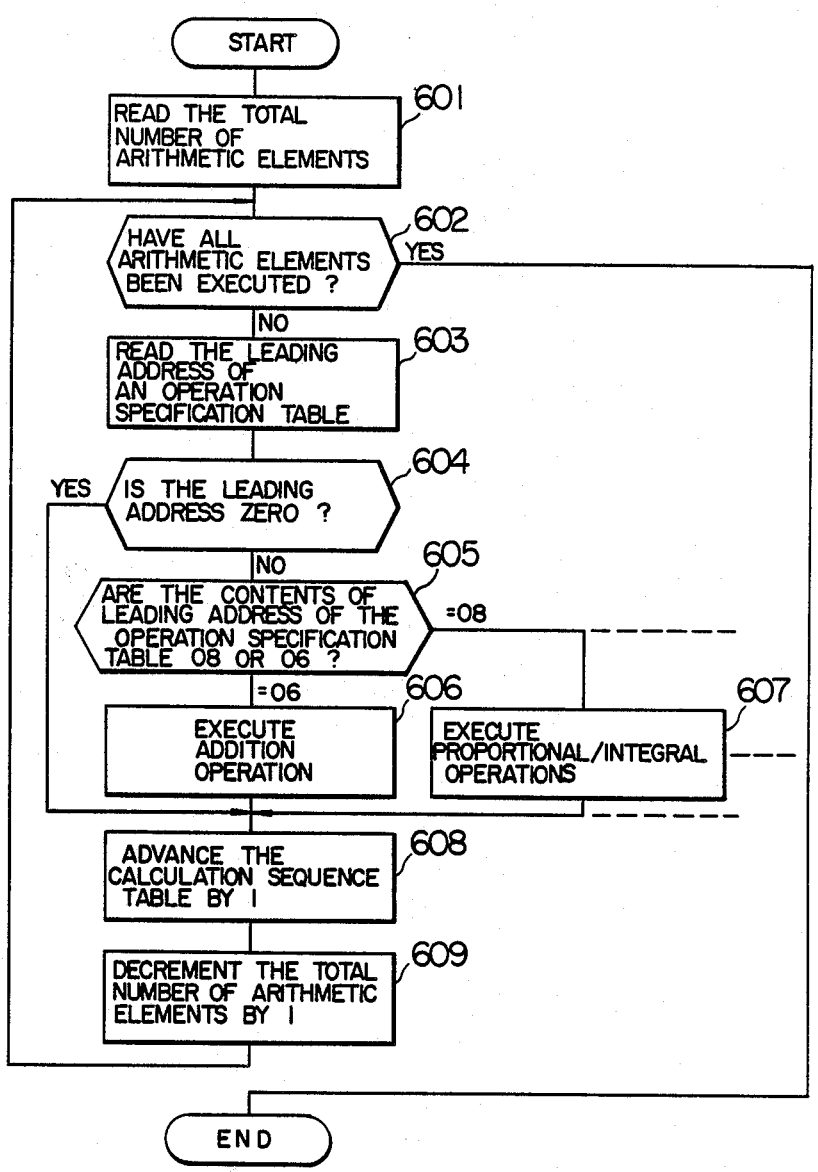
FIG. 6 is a flow chart of exemplary operation of a control operation processing program 305 in FIG. 3.

The execution procedure for the addition operation at the step 606 in FIG. 6 will be next explained more in detail with reference to FIG. 7. At a step 701, the leading address of the adder, for example, "2600" in FIG. 4, will be first set to a table pointer used to specify the address in the table. The table pointer will be incremented by 2 at a next step 702, in order to read the input 1 point numeral or number (at a step 703) and then to fetch the input 1 data from the data table 420 according to the corresponding address of the point number (at a step 704). The table pointer will be incremented by 1 at a step 705, so that the input 2 point number will be read at a step 706 and the input 2 data will be fetched from the data table 420 according to the corresponding address of the point number at a step 707. As soon as the table point is incremented by 1 at a step 708, the gain 1 point number will be read at a step 709 and the gain 1 data will be fetched from the data table 421 on the basis of the corresponding address of the gain 1 point number at a step 710. At steps 711 to 713, likewise, the gain 2 data will be fetched. At a next step 714, the program will execute to find an equation {(input 1)×(gain 1)+(input 2)×(gain 2)}. Next, the table pointer will be decremented by 4 at a step 715 in order to read the output point number (at a step 716) and to store or write the operation result at the step 714 into the corresponding data table 420 storage zone specified by the address of the point number (at a step 717). After the step 717, the program will jump to the step 608 in FIG. 6.

Figure 8:
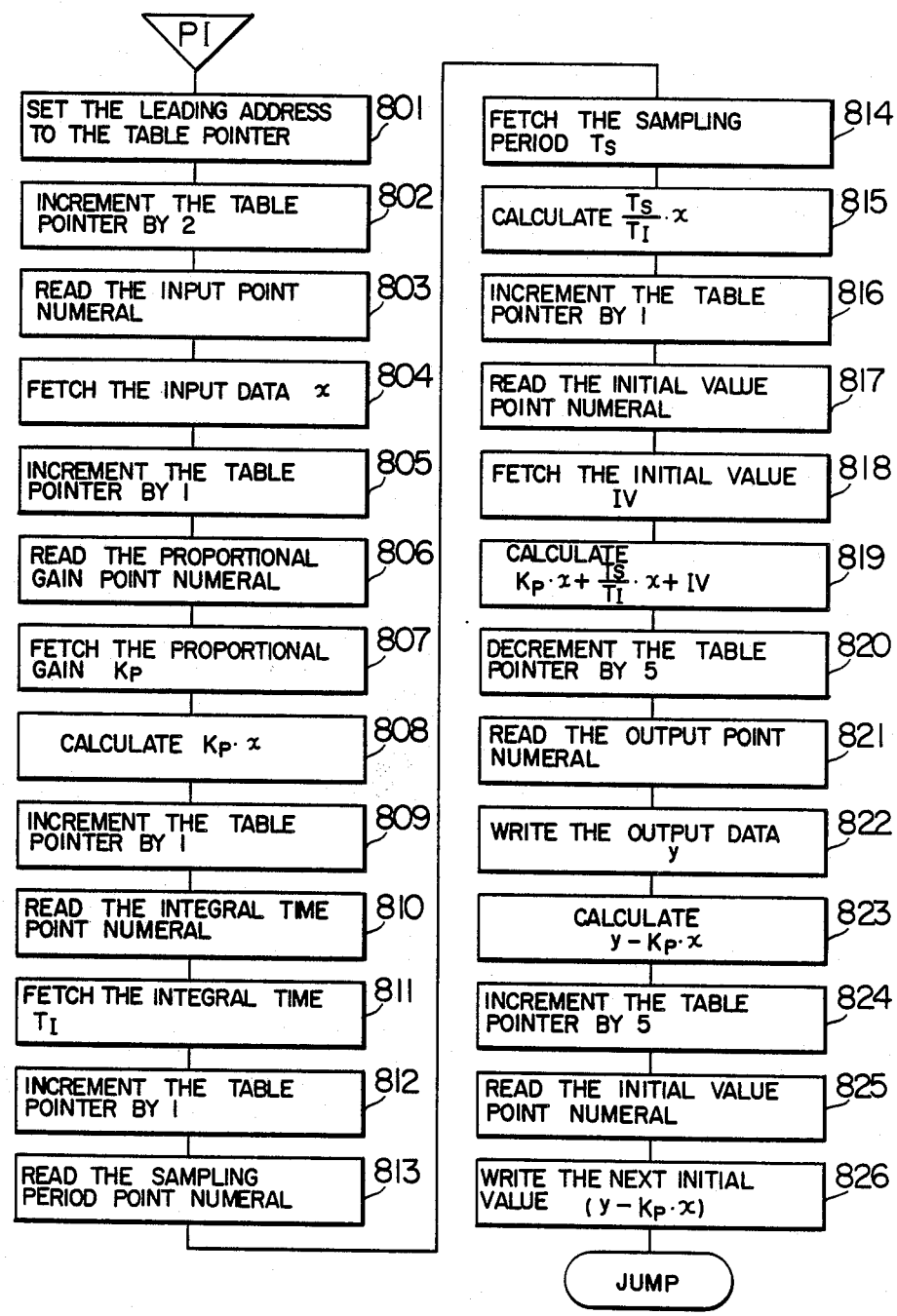
FIG. 8 is a flow chart of exemplary operation of a proportional/integral operation program at a step 607 in FIG. 6.

The execution procedure for proportional/integral operations at the step 607 in FIG. 6 will be next detailed in connection with FIG. 8. At a step 801, the leading address of the proportional/integral operation block will be first set to a table pointer. As soon as the table pointer will be incremented by 2 at a step 802, the input point number will be read at a step 803 and the data x corresponding to the input point number will be fetched from the data table 420 at a step 804. The table pointer will be incremented by 1 at a step 805, so that the proportional gain point number will be read at a step 806 and the proportional gain $K_p$ corresponding to the proportional gain point number will be fetched from the data table 421 at a step 807. At a step 808, the program will execute a calculation of $K_p \cdot x$ to store the execution result into the RAM. At a next step 809, the table pointer will be further incremented by 1 in order to read the integral time point number (at a step 810) and to fetch the integral time $T_I$ (at a step 811). Similarly, at steps 812 to 814, the sampling period $T_S$ will be fetched to calculate $(T_S/T_I)x$ at a step 815. The calculated result will be stored in the RAM. Likewise, the initial value IV will be fetched at steps 816 to 818 and the proportional/integral value y will be calculated at a step 819: where $y = K_p \cdot x + (T_s)/T_I \cdot x + IV)$. The table pointer will be decremented by 5 at a step 820 to read the output point number (at a step 821) and to store or write into the data table 420 the value y calculated at the step 819 on the basis of the address of the output point number (at a step 822). Next, the program will calculate $(y - K_p \cdot x)$ at a step 823 to write or store the calculated result into the initial value table to later use as its initial value IV at the time of executing the next proportional/integral operation block (at steps 824 to 826). The program will skip from the step 826 to the step 608 in FIG. 6. It will be readily understood that similar programs can be created for other arithmetic elements.

According to the invention, software modification and addition can be effected for operation blocks, which will be explained below in more detail. In order to add the feed-forward control function to the digital controlling device, for example, there are provided the function generator 33 and the adder 34 encircled by dotted lines in the operation block diagram of FIG. 2. In this connection, an input point numeral A010 is added and the output point numeral for the final driving signal is modified from A005 to A011.

In this case, it is required to modify only the following three types of tables: that is, (1) Calculation specification tables FG04 and AD02 for the function generator 33 and the adder 34 are added.

(2) The leading addresses of the two additional calculation specification tables are inserted in the calculation sequence table, as shown in FIG. 4.

(3) The total operation block number described in the calculation sequence table is increased by 2. In the embodiment of FIG. 4, the total operation block number "9" is increased to "11" by adding "2" to "9".

As will be obvious from the above disclosure, the present invention has such excellent effects that the software can be created highly efficiently and the software errors can be minimized, since the software is divided mainly into the processing program section and the table section so that programming can be easily accomplished only by entering numerals into portions in tables created in association with the operation block diagram for each application.

Further, in accordance with the present invention, the processing program section A can be completely fixed. Therefore, it is possible to handle the processing program section A as a sort of hardware by permanently fixing the section A in the ROM. This can save such troublesome labor as program loading. Furthermore, after the table section is once created, a protect switch may be provided so as to protect the memory.

What is claimed is:

1. A digital controlling device for controlling a section comprising means for executing arithmetic operations under control of a predetermined program on the basis of an input signal obtained from at least one detector in a section to be controlled to generate a driving signal and means for sending said driving signal to actuating means in said section to be controlled; said arithmetic operation executing means comprising:

(a) first rewritable and non-volatile means storing a plurality of calculation specification tables designating a type of arithmetic operation necessary to be executed, storage addresses of input/output data required for said designated arithmetic operation, and storage addresses of operation parameters required for said designated arithmetic operation;

(b) second rewritable and non-volatile means storing a calculation sequence table designating leading addresses of said calculation specification tables stored in said first means which are used for reading-out of said first means the calculation specification tables corresponding to said required arithmetic operations in a predetermined order for those arithmetic operations which are to be executed;

(c) third means storing data tables including data and operation parameters in corresponding address areas thereof as specified by the storage addresses in said calculation specification tables designated by said calculation sequence table; and (d) processing program means, including means for storing a plurality of programs to be specified by said arithmetic operation types for executing said arithmetic operations in said predetermined order designated in said calculation sequence table and for reading data and operation parameters necessary for said execution of arithmetic operations from said data tables stored by said third means on the basis of designated ones of said calculation specification tables.

2. A digital controlling device as set forth in claim 1 wherein the number of total arithmetic operations is designated in said calculation sequence table stored in said second means and said processing program means operates to manage the termination of execution of all arithmetic operations on the basis of said number of total arithmetic operations designated in said calculation sequence table.

3. A digital controlling device as set forth in claim 1 wherein said calculation specification tables and said calculation sequence table are stored in a read-only memory.

4. A digital controlling device as set forth in claim 1 wherein said data in said data tables is stored in a random access memory, and said operation parameters are stored in a read-only memory.

5. A digital controlling device as set forth in claim 1 wherein said processing program means operates on the basis of programs stored in a read-only memory.

* * * * *